United States Patent [19]

Lien et al.

[11] Patent Number: 5,309,264
[45] Date of Patent: May 3, 1994

[54] LIQUID CRYSTAL DISPLAYS HAVING MULTI-DOMAIN CELLS

[75] Inventors: Shui-Chih A. Lien, Briarcliff Manor; Richard A. John, Yorktown Heights, both of N.Y.

[73] Assignee: International Business Machines Corporation, Armonk, N.Y.

[21] Appl. No.: 879,256

[22] Filed: Apr. 30, 1992

[51] Int. Cl.$^5$ ............... G02F 1/1343; G02F 1/1337
[52] U.S. Cl. .................................. 359/87; 359/54; 359/77; 359/102
[58] Field of Search ............ 359/54, 58, 87, 77, 359/106, 102

[56] References Cited

U.S. PATENT DOCUMENTS

| | | | |
|---|---|---|---|
| 4,272,162 | 6/1981 | Togashi et al. | 359/102 |
| 4,389,095 | 6/1983 | Teshima et al. | 359/87 |
| 4,396,250 | 8/1983 | Wada et al. | 359/53 |
| 4,505,548 | 3/1985 | Berreman et al. | 359/90 |
| 4,556,286 | 12/1985 | Uchida et al. | 359/53 |
| 4,624,531 | 11/1986 | Wada et al. | 359/77 |
| 4,684,218 | 8/1987 | Aizawa et al. | 359/68 |
| 4,699,469 | 10/1987 | Larsen | 359/59 |
| 4,770,499 | 9/1988 | Kobayashi et al. | 359/46 |
| 4,787,712 | 11/1988 | Ukai et al. | 359/54 |
| 4,837,058 | 6/1989 | Aizawa et al. | 428/1 |
| 4,840,460 | 6/1989 | Bernot et al. | 359/54 |
| 4,865,425 | 9/1989 | Kobayashi et al. | 359/46 |
| 4,881,066 | 11/1989 | Kanno et al. | 340/719 |
| 4,931,787 | 6/1990 | Shannon | 340/784 |
| 4,995,703 | 2/1991 | Noguchi | 359/54 |
| 5,084,778 | 1/1992 | DeJule et al. | 359/87 |
| 5,136,407 | 8/1992 | Clerc | 359/87 |
| 5,142,390 | 8/1992 | Ohta et al. | 359/58 |
| 5,229,873 | 7/1993 | Hirose et al. | 359/87 |

FOREIGN PATENT DOCUMENTS 0445777 9/1991 European Pat. Off. .

OTHER PUBLICATIONS

Jean Frederic Clerc, "Vertically Aligned Liquid-Crystal Displays" SID 91 Digest, 35.6:, pp. 758-761 (May 5-10, 1991).

Tsuyoshi Yamamoto et al., "Full-Cone Wide-Viewing-Angle Multicolor CSH-LCD", SID 91 Digest, 35.7, pp. 762-765 (May 5-10, 1991).

*Primary Examiner*—William L. Sikes
*Assistant Examiner*—Huy Mai
*Attorney, Agent, or Firm*—David Aker

[57] ABSTRACT

A liquid display comprises a first substrate having a plurality of electrodes thereon, a second substrate having a common electrode, and a liquid crystal material disposed between the first substrate and the second substrate. The common electrode has a pattern of openings therein which causes display elements of the display to have more than one liquid crystal domain. The common electrode is otherwise continuous, except where the pattern of openings is located. The liquid crystal display is of the active matrix variety. It may be a multi-domain homeotropic liquid crystal display or a multi-domain twisted nematic liquid crystal display. It may be a crossover type of display wherein gate lines and data lines are disposed on one substrate and insulated from one another at crossover regions, or a non-crossover type with gate lines, pixel electrodes and active devices on one substrate and data lines having a pattern of openings in accordance with the invention on the opposite substrate.

29 Claims, 8 Drawing Sheets

LIQUID CRYSTAL DISPLAYS HAVING MULTI-DOMAIN CELLS

DESCRIPTION

1. Technical Field

This invention relates to liquid crystal displays (LCD's). More particularly it relates to liquid crystal displays of the homeotropic and twisted nematic type having multi-domain cells.

2. Background Art

Flat panel displays have been become increasingly important in the computer industry and in other industries where the display of information is important. These types of displays provide unique opportunities for lowering the weight, size and eventually the cost of displaying information.

Liquid crystal displays seem to hold the most promise as the technology which will eventually be utilized in almost all practical flat panel displays. Considerable success has been achieved in small size color televisions and in monochrome flat panel displays as well as larger sizes used in notebook or laptop computers. However, unlike the cathode ray tube display, which exhibits good viewing quality from a variety of angles, conventional liquid crystal displays suffer from a loss of contrast or contrast reversal when viewed from an angle other than normal to the plane of the display. This is due to the interaction of light with the molecules of the liquid crystal material in the liquid crystal display cells which make up the flat panel display. Light traveling through these display cells at other than a normal angle of incidence interacts with the liquid crystal display molecules in a manner different from that of light traveling with normal incidence. The contrast between a light transmissive (white) state and a nontransmissive state (black) is drastically decreased, thus making such displays less desirable for use in many applications, such as flat panel television screens and large computer screens.

There have been various attempts to solve this problem. For example, it is possible to construct one substrate (that not having any active device, thereon) with a triangular or sawtooth cross section, so that an average of contrast ratio between different areas occurs. This approach results in large increases in manufacturing cost and is not considered to be a practical solution.

SUMMARY OF THE INVENTION

It is a principle object of the invention to provide a liquid crystal display having high contrast over a wide viewing angle.

It is a further object of the invention to provide a liquid crystal display wherein a relatively high percentage of light is transmitted through the display when a display element is in a bright state.

It is an additional object of the invention to provide a liquid crystal display having multi-domain cells where the domain boundaries are reliably fixed and not subject to change due to variations in local cell conditions.

It is yet another object of the invention to accomplish the aforementioned objects in an active matrix liquid crystal display.

In accordance with the invention, a liquid display comprises a first substrate having a plurality of electrodes thereon, a second substrate having a common electrode thereon, and a liquid crystal material disposed between the first substrate and the second substrate. The common electrode has a pattern of openings therein which causes display elements of the display to have more than one liquid crystal domain. The common electrode is otherwise continuous, except where the pattern of openings is located.

Further, in accordance with the invention the liquid crystal display is of the active matrix variety. It may be a multi-domain homeotropic liquid crystal display or a multi-domain twisted nematic liquid crystal display. It may be a crossover type of display wherein gate lines and data lines are disposed on one substrate and insulated from one another at crossover regions, or a non-crossover type with gate lines, pixel electrodes and active devices on one substrate and data lines having a pattern of openings in accordance with the invention on the opposite substrate.

DETAILED DESCRIPTION OF PREFERRED EMBODIMENT

Figure 1:
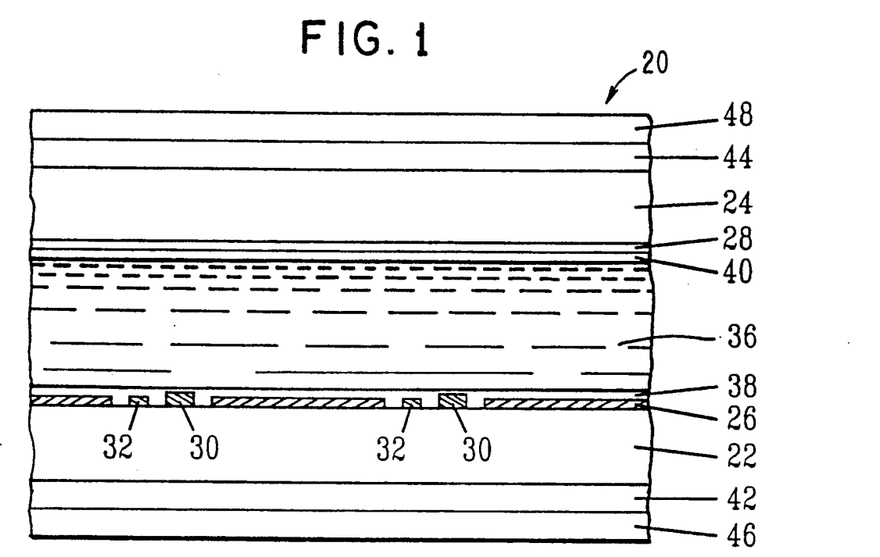
FIG. 1 is a cross section of a prior art crossover type active matrix liquid crystal display.

Referring to FIG. 1, a conventional liquid crystal display 20 includes a first substrate 22 and a second substrate 24 formed of a transparent material such as glass. The two substrates are arranged so as to be parallel to one another with a high degree of precision, are typically separated from one another by a distance of approximately four to seven microns, and are sealed at their edges (not shown) so as to define a closed interior space therebetween. Substrate 24 has deposited thereon a continuous electrode 28 having no pattern or openings therein and preferably formed of a thin transparent layer of a material such as indium tin oxide (ITO) which is electrically conductive. Substrate 22 has deposited thereon an array of electrodes 26 which define pixels of the liquid crystal display. Also formed on substrate 22 in selected areas not having electrode films deposited thereon are semiconductor devices such as diodes or thin film transistors (TFT's) 30. As is well known in the art, there are one or more TFT's for each pixel. TFT's 30 are each controlled by a conductive gate line 32 and a conductive data line not shown, which are deposited on substrate 22 in a manner so as not the be electrically connected to electrodes 26 except that the source of each TFT 30 is electrically connected to one respective electrode 26. Gate lines 32 and data lines (not shown) are also electrically insulated from one another at crossover regions.

A liquid crystal material 36 fills the space between substrates 22 and 24. The nature of the material depends on the mode of operation of liquid crystal display 20, as will be more fully explained below.

The interior surfaces of the liquid crystal display may be coated with respective alignment layers 38 and 40 to provide boundary conditions for the molecules of liquid crystal material 36.

In the case of homeotropic type LCD's, liquid crystal (LC) molecules near the boundary of the substrate surface are aligned so that the long axes of the LC molecules are almost perpendicular to the substrate surface with a small pretilt angle, typically one to two degrees of tilt, away from the substrate normal. In the case of twisted nematic type LCD's, LC molecules near the boundary of the substrate surface are aligned such that the long axes of the LC molecules are almost parallel to the substrate with a small pretilt angle (also one to two degrees of tilt), away from the substrate surface.

The exterior surfaces of substrates 22 and 24 may, with some liquid crystal displays, have respective optical compensating films 42 and 44 disposed thereon. Finally, respective polarizing films 46 and 48 are applied over compensation film 42 and 44, respectively.

Conventional liquid crystal displays of the type illustrated in FIG. 1 are illuminated by a light source (not shown) located below the panel (the substrate 22 side) and are viewed from above the panel (the substrate 24 side).

The electrode patterns for various embodiments of the invention are illustrated the various successive figures and are described below.

Referring to FIG. 2 to FIG. 9, various embodiments of the electrode patterns of multi-domain homeotropic cell liquid crystal displays are illustrated. For simplicity, no TFT's, gate lines or data lines are shown. In accordance with the present invention, homeotropic cells rely on alignment of the molecules of the liquid crystal material in a direction perpendicular to the substrates when no electric field is applied between the electrodes. In contrast to the conventional homeotropic liquid crystal display, there is no pretilt required and thus no rubbing process is used. The liquid crystal display must exhibit negative dielectric anisotropy. Typical materials are type ZLI-4788 or ZLI-2857 manufactured by E. Merck Darmstadt of Germany and available in the United States through EM Industries.

As is well known in the art, homeotropic cells use a compensating film to reduce light leakage for light that travels through the liquid crystal display panel in a direction other than perpendicular to the substrates. For best results, the product of the thickness of the liquid crystal material layer in the liquid crystal display cell and the difference between the extraordinary and ordinary indexes of refraction for the liquid crystal display material is equal to the product of the thickness of the compensating film and the difference between the ordinary and extraordinary indexes of refraction of the compensating film.

When an electric field is applied between the electrodes of a homeotropic liquid crystal display cell, the molecules are caused to be oriented in a direction substantially perpendicular to the electric field. The present invention, by providing electrode configurations which produce lateral electric fields at openings therein as well as at pixel electrode edges, exploits this effect to provide multi-domain LCD cells. The characteristics of the domains are determined by the shape of the patterns on the electrodes.

In FIG. 2 to FIG. 8, the bottom electrode (the electrode on the lower substrate which also carries the thin film transistors) is shown in dotted lines, while the electrode pattern for the top electrode of a pixel is shown in solid lines. However, it will be understood that the ITO coating which makes up the top electrode for all pixels, and in the prior art is continuous, in the case of the present invention has at least one opening therein, for each pixel, in an electrode which is otherwise continuous across the entire display area.

Figure 2:
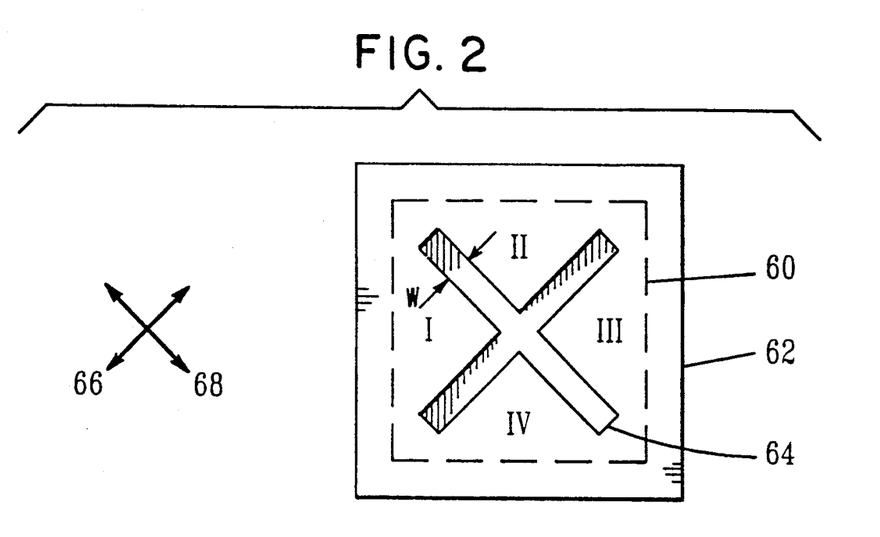
FIG. 2 to FIG. 9 illustrate electrode patterns for various embodiments of homeotropic liquid crystal displays according to the invention.

Referring to FIG. 2, the bottom pixel electrode 60 is a continuous square (although separated on all sides from adjacent pixel electrodes of the same type by gate and data bus lines (not shown)) while the portion of the common electrode which forms top pixel electrode 62 has an X-shaped cutout 64 formed therein with the ends thereof pointing at the corners of the pixel. In other words the lines that make up the X are disposed at an angle of 45 degrees with respect to the edges of the pixel. The width W of the cutout portion is preferably 5 microns for optimum results in a pixel which has dimensions of, for example, 150 microns by 150 microns. However, the width W for optimum results, that is stable well defined boundaries between the domains in a pixel, which result in good contrast and uniformity in display quality over a large range of viewing angles, is relatively independent of the size of the pixel, which may range, for example, from 100 to 200 microns on a side.

Due to the fact that bottom electrode 60 has smaller outside dimensions than top electrode 62, advantageously, the direction of the electric field around the periphery of the pixel and at the edge of the cutout is such that each pixel is divided into four domains. In each domain the director of the liquid crystal display molecules is always aligned so as to tilt in a direction toward the center of the pixel when an electric field is applied (as opposed to being perpendicular to the substrates when there is no electric field applied). However, the X shaped cutout 64 defines the boundaries of four distinct liquid crystal domains I, II, III, and IV. These domains are accurately defined by X shaped cutout 64 regardless of local conditions in each liquid crystal display cell because a definite boundary condition and a well defined tilt direction is established for each liquid crystal molecule.

Polarizing films are disposed over the compensation films so that the transmission axes thereof are perpendicular to one another but each are at an angle of 45 degrees with respect to the edges of the liquid crystal display. More generally the directions of polarization are aligned at an angle of 45 degrees with respect to the direction of tilt of the molecules when an electric field is present. For example, in FIG. 2, the transmission axes for the two polarization films are also at an angle of 45 degrees with respect to the edges of the liquid crystal display, and are represented by lines 66 and 68.

There is some loss of light transmission due to there being more than one domain per pixel. Boundary regions between the domains (that is, those regions having a disclination line) do not transmit light as well as the areas of the domains themselves. However, if electrode patterns in accordance with the invention are used, the lose is relatively minor. For example, for the pattern of FIG. 2, approximately 83% of the light which would be available in a comparable conventional one domain cell is available for viewing, that is the relative transmission efficiency is approximately 83%.

In FIG. 3 to FIG. 7 the pixels are not of equal width and length. Typically the pixel sizes are chosen to have a 1:3 aspect ratio, that is to be for example, 110 microns wide by 330 microns long. Bottom electrode 70 is continuous and isolated from the electrodes of adjacent pixels by data and gate bus lines. Top pixel electrode 72 has an opening or cutout 74 having an elongate shape which diverges into two branches at each end for a so called "double-Y" configuration. The width of the central portion, shown as dimension X is 10 microns for best results, while the width of the diverging portions at the ends of the central portion, shown as dimension Y is preferably 5 microns to achieve best results. In a manner similar to that of FIG. 2, four separate liquid crystal domains are established. The size of domain A is equal to the size of domain B. The size of domain C is equal to the size of domain D. However, as is readily apparent from FIG. 3, domains A and B are significantly larger than domains C and D.

Figure 3:
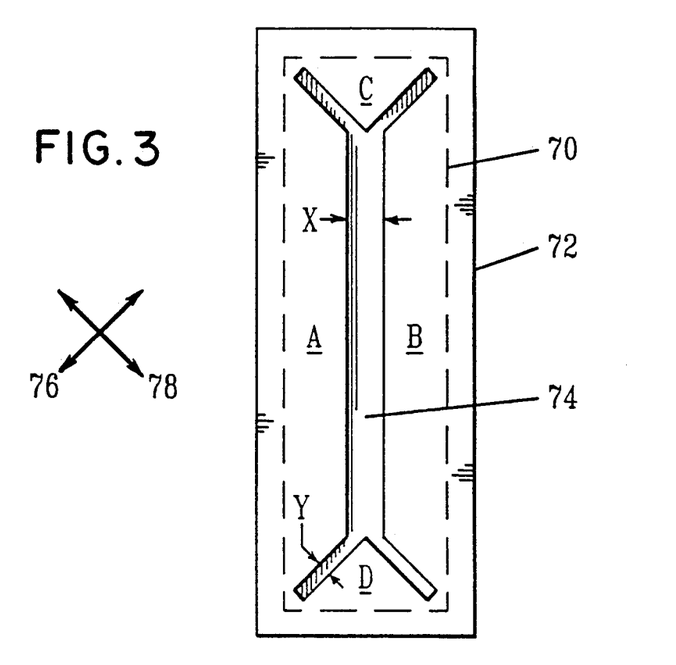

Typically the diverging portions of the "double-Y" shaped configuration are perpendicular to one another and disposed at an angle of 45 degrees with respect to the edges of the pixel. The central portion of the "double-Y" shape is disposed parallel to the longer edges of the pixel and perpendicular to the shorter edges. The transmission axes of the polarizing films are as illustrated by arrows 76 and 78. The relative transmission efficiency is approximately 84%.

Figure 4:
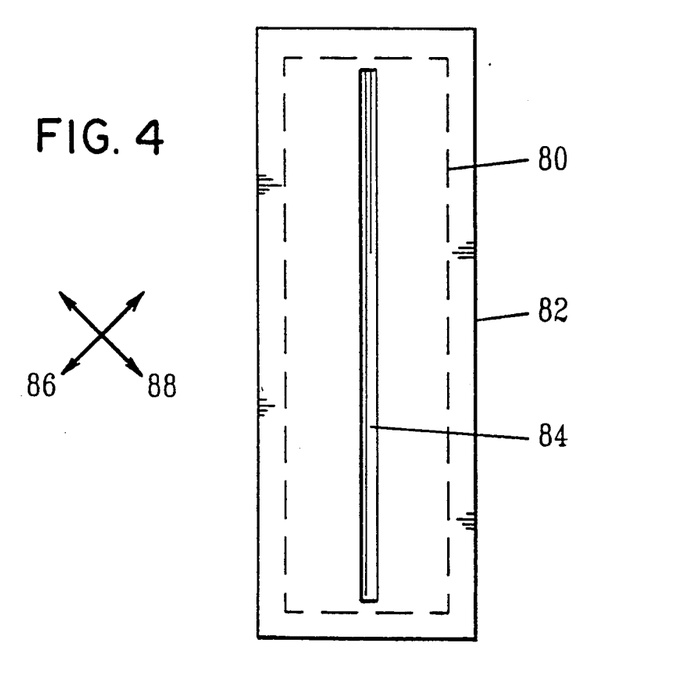

The embodiment of FIG. 4 has a continuous bottom electrode 80 and a top electrode 82 with a slot 84 extending its center line in a direction parallel to the edges which define the length of the pixel. Opening or slot 84 has a width of approximately 10 microns for the best results. The polarization directions for the polarizer films are as represented by arrows 86 and 88. The relative transmission efficiency as compared to a conventional, single domain liquid crystal display cell is approximately 80%. The electrode pattern produces essentially a two domain cell wherein the molecules in the liquid crystal material in the cell tilt outward from the bottom electrode 80 to the top electrode 82, due to the smaller size of bottom electrode 80 and the cutout design.

Figure 5:
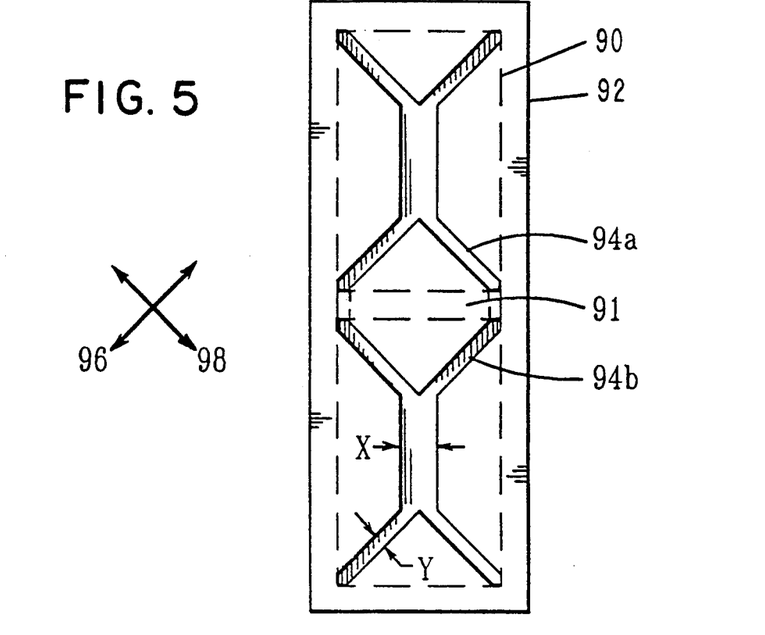

Referring to FIG. 5 a bottom electrode 90 has a cutout 91 in the shape of a rectangle with a preferred width of 10 microns and with the major direction being across the width of the pixel. Top electrode 92 has two "double-Y" cutout 94a and 94b having a preferred width Y of 5 microns at the end portions thereof and width X of 10 microns at the center portion thereof. Cutout 94a is arranged to overlie that portion of electrode 90 above rectangular cutout 91 in FIG. 5, and cutout 94b is arranged to overlie that portion of electrode 90 below cutout 91b.

The pixel electrode pattern in FIG. 5 causes the liquid crystal display cell to be predictably divided into eight domains. The transmission axes for the polarizer films are represented by lines 96 and 98. The relative transmission efficiency is approximately 81% that of a comparable single domain cell.

Figure 6:
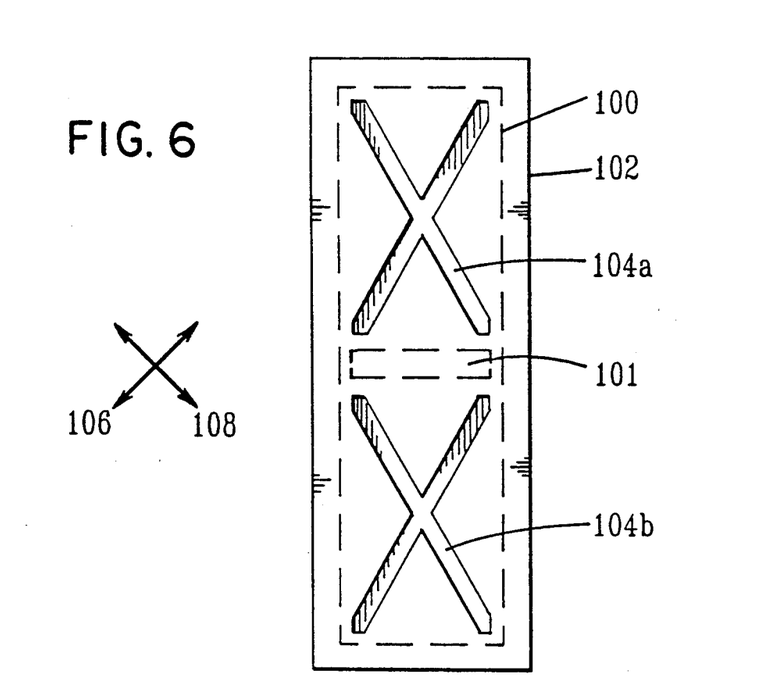

FIG. 6 illustrates a so called double X electrode pattern. Bottom electrode 100 has a rectangular cutout 101 similar to cutout 91. Top electrode 102 has two generally X shaped cutouts, 104a and 104b disposed over a portion of bottom electrode 100 above cutout 101 and a portion of bottom electrode 100 below cutout 101, respectively. The transmission axes of the polarizers are shown as arrows 106 and 108. Eight distinct liquid crystal domains are formed and the relative transmission efficiency is approximately 70% as compared to a comparable conventional one domain cell. The preferred width W is 5 microns.

Figure 7:
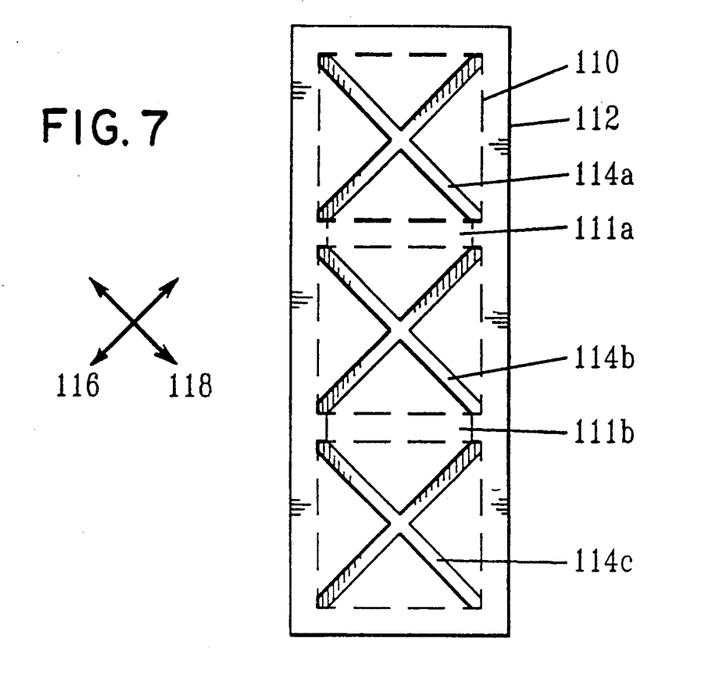

The electrode pattern of FIG. 7 is similar in many respects to that of FIG. 6 except that lower electrode 110 has two rectangular cutouts 111a and 111b which are similar to cutout 91 and 101 of FIG. 5 and FIG. 6, respectively. Top electrode 112 has three X shaped cutouts, 114a, 114b and 114c disposed above a top, a middle, and a bottom portion of bottom electrode 110, the middle portion being between cutouts 111a and 111b. The electrode pattern of FIG. 7 produces a total of twelve distinct domains. The liquid crystal cell has a relative transmission efficiency of approximately 72% as compared to that of a conventional one domain liquid crystal display cell. The transmission axes of the polarizers are represented by arrows 116 and 118.

Figure 8:
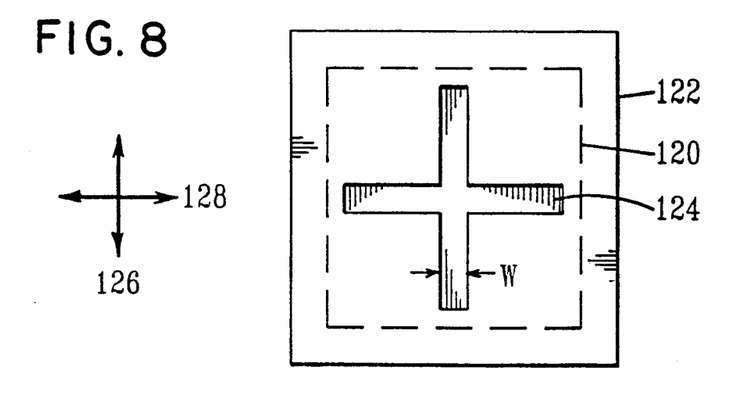

FIG. 8 illustrates a so-called "+" electrode configuration. A continuous bottom electrode 120 has, disposed above it, an opening 124 in a top electrode 122 which is part of the continuous common ITO electrode. Due to the fringe field at the edges of electrode 120 and at opening 124, the liquid crystal molecules are tilted toward the center of cross shaped opening 124 and as a result four independent domains are formed with the boundaries therebetween being definitely and controllably determined by opening 124. Relative transmission efficiencies are approximately 60% those of a comparable, conventional one domain liquid crystal display. Width W is again on the order of 5 microns for best results. The transmission axes of the polarizers are as represented by arrows 126 and 128.

Figure 9:
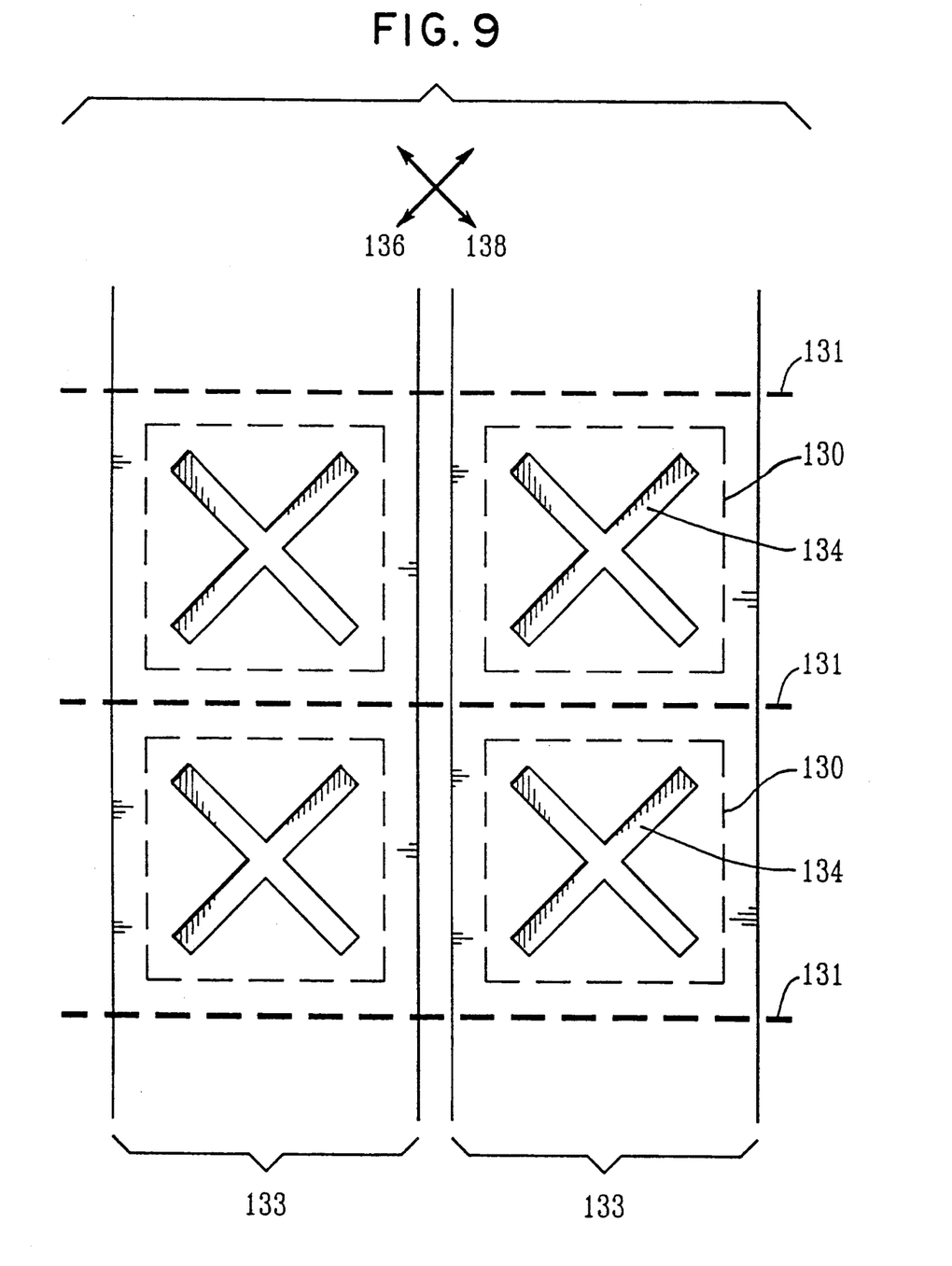

FIG. 9 illustrates a group of pixels in a non-crossover type homeotropic active matrix liquid crystal display. For simplicity, the TFTs are not shown. The lower substrate has deposited thereon bottom electrodes 130 and gate line 131 as well as the TFTs (not shown). The upper substrate has a series of data lines 133 which are wider than bottom electrodes 130 and are disposed over a series of electrodes 130 arranged in vertical columns, with the edges of the data lines 133 extending beyond the edges of the bottom electrodes 130. An X-shaped opening or cutout 134 (similar to cutout 64 of FIG. 2) in data lines 133 over each bottom electrode 130 causes each liquid crystal display to be divided into four distinct domains. As noted above with respect to FIG. 2, the relative transmission efficiency is approximately 83% that of a comparable, conventional single domain liquid crystal display cell. The directions of the polarizers are represented by arrows 136 and 138.

It will be understood that in accordance with the invention, any of the patterns illustrated in FIG. 2 to FIG. 8 may be used in a non-crossover active homeotropic LCD.

The remaining figures illustrate electrode configurations for multi-domain twisted nematic liquid crystal display cells. It is conventional in such cells that the liquid crystal molecules achieve a left-handed twist of between 70 degrees and 90 degrees using a chiral additive. Generally, rubbed alignment layers are used with one substrate being rubbed in a first direction and a second substrate being rubbed in a second direction at an angle with respect to the first direction. In accordance with the present invention, two rubbing directions are also used, but one substrate is rubbed in a direction opposite to that of a conventional liquid crystal display. In this regard reference is made to copending U.S. patent application Ser. No., 07/776,158 filed on Oct. 15, 1991, and assigned to the assignee of the present invention, which is incorporated herein by reference. Referring specifically to FIG. 7 in said application, rubbing the alignment film of one substrate in a direction opposite to that of a conventional LCD cell causes the liquid crystal molecules to have opposite directions of pretilt on opposite substrates. Further, the molecules in a plane centrally located between the substrates have an orientation which is parallel to the substrates.

Polarizers are used. They may be disposed so that the transmission axis of one polarizer is perpendicular to that of the other polarizer. It will be understood by one skilled in the art that other cell configurations may be used. The cells may be normally white or normally black or operating a e-mode or o-mode. Right-hand twist or left-hand twist may be used. Finally, in general, a twist angle anywhere between 0 degrees and 360 degrees may be used.

The liquid crystal material used in the twisted nematic liquid crystal displays may be types such as ZLI-3771 and ZLI-4718 which have positive dielectric ansotropy and are available from E. Merck, Darmstadt.

Twisted nematic liquid crystal displays generally use no compensating film (although it can be used if needed). However, when the electric field is present and the liquid crystal display cells do not transmit light, it is necessary to prevent light leakage around areas where the ITO electrode material has been removed. Generally, as is well known in the art, a black matrix material is used for normally white applications.

FIGS. 10-15 illustrate various embodiments of electrodes for twisted nematic LCD cells in accordance with the present invention. What is generally true in accordance with the present invention is that the openings in the continuous upper electrodes are shaped and positioned so that fringe fields produced by these openings at one edge of a domain are parallel to fringe fields at the opposite edge of the same domain and thus the domains of the liquid crystal display cells are very well defined and their shapes are independent of local conditions such as the nature or quality of the rubbing used to pretilt the liquid crystal display molecules. In addition, the orientation of the molecules in the central plane of the liquid crystal material that is half way between the upper substrate and the lower substrate is unambiguously defined when a voltage is applied. In prior attempts to produce multi-domain liquid crystal display cells, ambiguities in the orientation of these molecules also lead to a lack of reproducibility of the shape of the liquid crystal domains.

Figure 10:
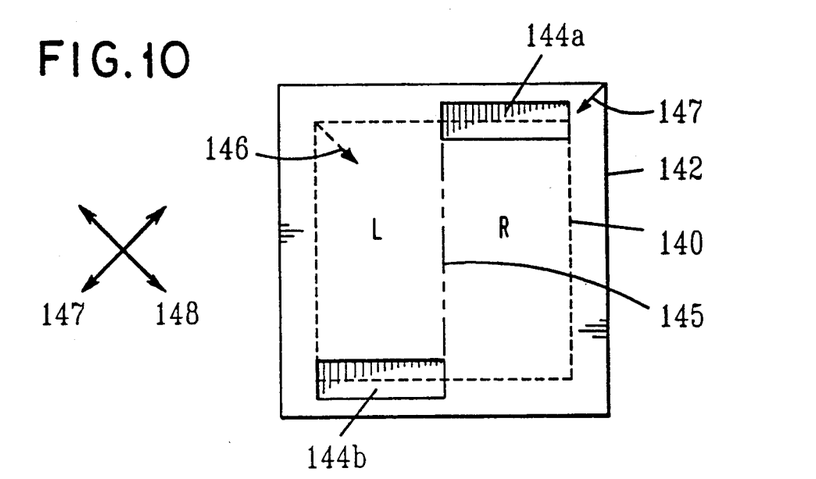
FIG. 10 to FIG. 15 illustrate electrode patterns for various embodiments of twisted nematic liquid crystal displays according to the invention.

Referring specifically to FIG. 10 bottom electrode 140 is aligned with the portion of the continuous ITO film 142 that constitutes the top electrode for all the liquid crystal display cells. Openings 144a and 144b in the ITO common electrode are located along the top and bottom edges, of bottom electrode 140, respectively. Opening 144a extends from a point immediately above the right edge of bottom electrode 140 to end half way across bottom electrode 140. The opening straddles the upper edge of electrode 140. Opening 144b extends from the left edge of bottom electrode 142 to a point centrally located along the bottom edge of bottom electrode 140. Thus, the ends of opening 144a and 144b are both disposed along an imaginary line 145 so as to define a left domain L and right domain R with the molecules of the liquid crystal display material tilting in opposite directions in the two domains due to the fact that the electric fields at the edges are tilted in a direction parallel to one another as explained above.

The rubbing directions are illustrated by arrow 146 for the lower substrate and arrow 147 for the upper substrate for a cell having left-hand chirality. The transmission axes of the polarized films are illustrated by arrows 148 and 149 for the normally white case. The relative transmission efficiency is 80 to 90% as compared to a comparable single domain liquid crystal display cell.

It will be understood that contrast and gray scale may be well maintained through large viewing angles for all viewing directions but that unlike the four domain case, excellent display performance may not be present throughout as wide a range in the vertical direction as in the horizontal direction. It will be understood by one skilled in the art that the electrode pattern on the continuous ITO film, that is openings 144a and 144b may instead be located along the left and right edges of the bottom electrode 140. In other words, the electrode pattern for each cell may be rotated by 90 degrees about an axis extending from the center of bottom electrode 140 in a direction perpendicular to the plane of the top and bottom substrates. It will be understood by one skilled in the art that an electrode pattern of this later type will have good contrast and gray scale over a large variation in viewing angle for all viewing directions but that excellent display performance may not be present throughout as wide a range in the horizontal direction as in the vertical direction. The relative transmission efficiency is comparable to that the liquid crystal display cell in accordance with FIG. 10.

Figure 11:
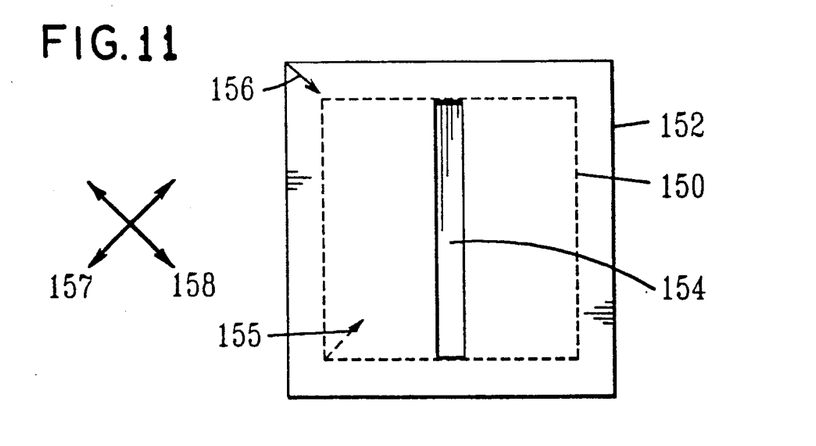

Referring to FIG. 11, bottom electrode 150 underlies a portion of the ITO common electrode forming upper electrode 152. A cutout 154 runs vertically for a distance slightly longer than the square dimension of bottom electrode 150. Cutout 154 divides the pixel into left and right domains, respectively. The rubbing direction for the lower substrate is represented by arrow 155 while that for the upper substrate is represented by arrow 156 for cells with left hand chirality. The transmission axes of the polarizer films are represented by arrows 157 and 158, respectively for the normally white mode. The relative transmission efficiency is approximately 80 to 90% of that of a comparable single domain liquid crystal display cell. Constrast and gray scale over a large variation in viewing angles in the up and down directions is better than that in the right and left directions. However, as described above with respect to FIG. 10, the pattern on the common ITO upper electrode may be rotated by 90 degrees if better viewing angle in the left and right directions is desired.

Figure 12:
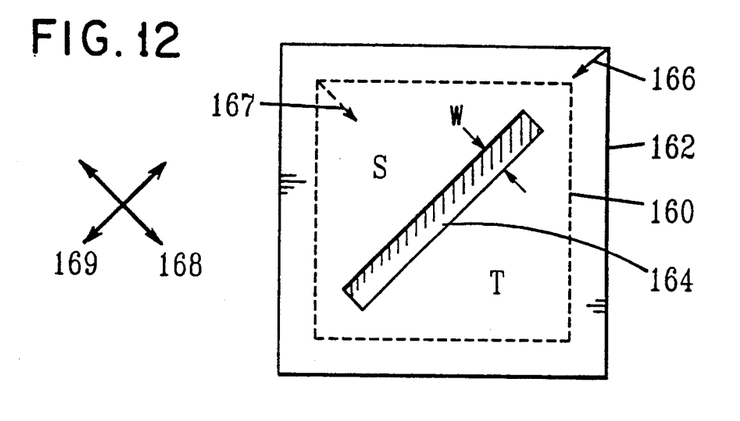

Referring to FIG. 12 bottom electrode 160 underlies a portion of the ITO common electrode shows as upper electrode 162. A diagonal opening 164 extending over a distance less than the total length of the diagonal of bottom electrode 160 and having a width W of 5 microns extends in a direction from the lower left-hand corner to the upper right-hand corner of the LCD cell. The rubbing directions for the upper and lower substrates are illustrated by arrows 166 and 167, respectively for cells with left hand chirality. The transmission axes for the polarizers are illustrated by arrows 168 and 169, for the normally white mode.

The liquid crystal display cell of FIG. 12 is divided into two domains S and T. The relative transmission efficiency is approximately 80 to 90% of that for a comparable single domain liquid crystal display cell.

In order to assure uniformity of contrast and gray scale performance, the electrode pattern for the pixel in FIG. 12 may be disposed adjacent to a pixel having a similar electrode pattern except that opening 164 would extend from the upper left-hand corner to the lower right-hand corner. Thus, variations in performance at difference viewing angles (left, right, up and down) up to some maximum angle are substantially eliminated.

Figure 13:
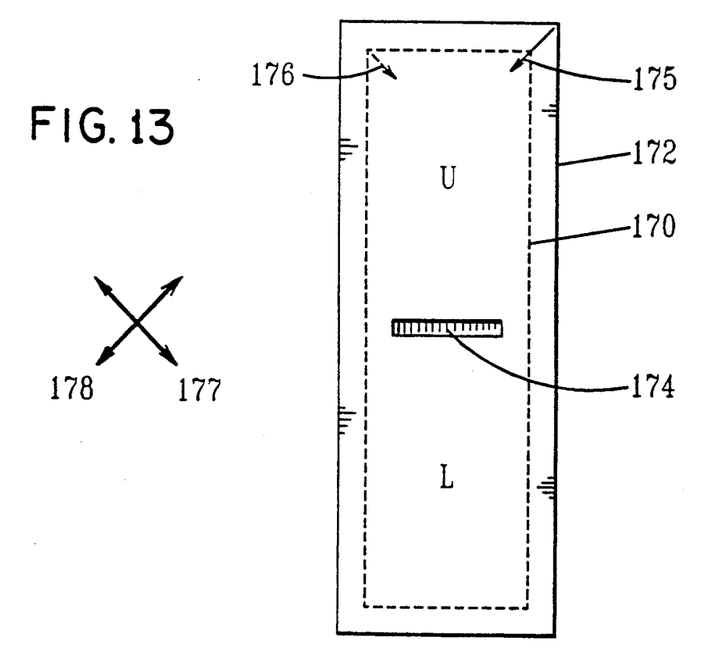
Figure 14:
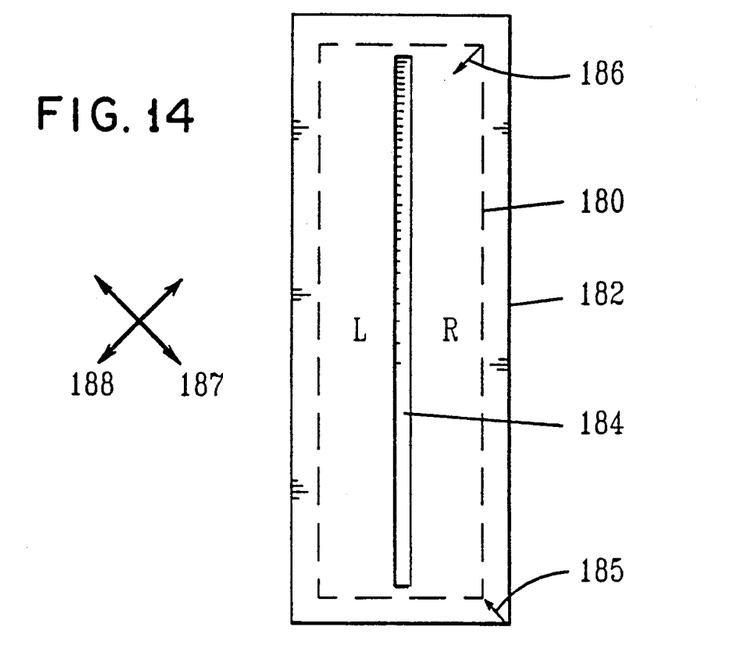
Figure 15:
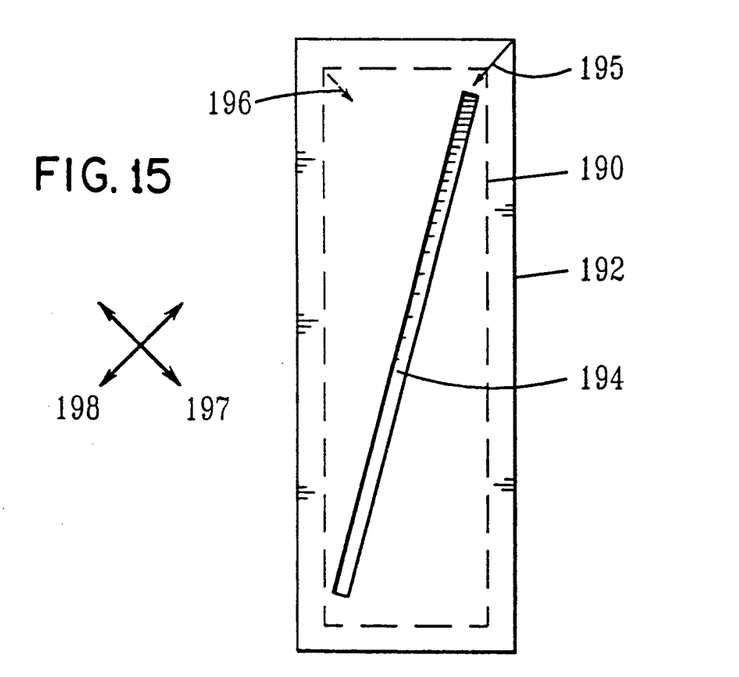

While FIGS. 10 to 12 have square display elements, FIGS. 13, 14 and 15 have rectangular display elements.

Referring to FIG. 13, bottom electrode 170 underlies a portion of the common ITO electrode 172 having a horizontal slot 174 therein. The rubbing direction for the upper substrate is indicated by arrow 175 while that for the lower substrate is indicated by arrow 176 for a cell having left hand chirality, and transmission axes of the polarizer films are indicated by arrows 177 and 178, respectively, for the normally white mode.

This electrode configuration produces an upper domain U and a lower domain L. This two domain structure has a relative transmission efficiency of approximately 80-90% as compared to that of a comparable single domain LCD cell.

Referring to FIG. 14, bottom electrode 180 underlies a portion of the common ITO electrode forming an upper electrode 182 for the pixel. A slot 184 runs in the vertical direction in electrode 182 and extends for a length slightly less than that of bottom electrode 180. The rubbing directions for the top and bottom substrates are as indicated by arrows 185 and 186, respectively, for a cell having left hand chirality. The transmission axes for the polarizing films are as illustrated by arrows 187 and 188, for normally white mode. The electrode arrangement of FIG. 14 divides the pixel into a left domain L and a right domain R. This two domain LCD cell has a relative transmission efficiency of 80-90% as compared to a comparable single domain liquid crystal cell.

Referring to FIG. 15, bottom electrode 190 underlies a portion of the ITO common electrode forming an upper electrode 192 and having a diagonal slot or opening 194 therein. The rubbing directions for the orientation films for the top and bottom substrates are indicated by arrows 195 and 196, respectively, for a cell with left hand chirality. The transmission axes for the polarizers are as indicated by arrows 197 and 198, for the normally white mode.

While opening 194 is disposed along a diagonal of bottom electrode 190 which extends from the lower left-hand corner to the upper right-hand corner of the pixel, it will be understood that for best uniformity of viewing angle it is preferred that immediately below a pixel in accordance with FIG. 15, there be a pixel of equal dimensions and with the same electrode configuration, except that the opening 194 is disposed along a diagonal extending from the upper left-hand corner to the lower right-hand corner of that additional pixel. Thus, contrast and gray scale performance will be substantially uniform regardless of direction, out to a maximum viewing angle.

It will be understood by those skilled in the art that in accordance with the invention, all of the patterns illustrated in FIG. 10 to FIG. 15 may be used in either crossover or non-crossover twisted nematic LCD's.

Thus, the present invention provides multi-domain homeotropic and multidomain twisted nematic (with twist angles between zero and 360 degrees) liquid crystal displays which provide good contrast ratio and excellent gray scale performance over a wide variety of viewing angles. In many cases, this can be as great as 50 degrees from center in all viewing directions. This is accomplished without significant increases in cost or complexity of the liquid crystal display, and with good light transmission efficiency.

While the invention has been described in connection with specific embodiments, it will be understood that those with skill in the art may be able to develop variations of the disclosed embodiments without departing from the spirit of the invention or the scope of the following claims:

What is claimed is:

1. A liquid crystal display comprising display elements arranged in an array of rows and columns, a first substrate having a plurality of electrodes thereon, a second substrate having a common electrode thereon, a liquid crystal material disposed between the first substrate and the second substrate, and said common electrode having a pattern of openings therein so that said display elements are caused to have more than one liquid crystal domain, the common electrode being otherwise continuous except where the pattern is located, the common electrode spanning an entire display area so as to serve as an electrode for all said display elements.

2. The liquid crystal display of claim 1 configured as a twisted nematic liquid crystal display.

3. The liquid crystal display of claim 2 wherein the first substrate and the second substrate are rubbed in directions so that the pretilt of liquid crystal molecules at the first substrate is in a direction opposite to the pretilt of liquid crystal molecules at the second substrate.

4. The liquid crystal display of claim 1 configured as a homeotropic liquid crystal display.

5. The liquid crystal display of claim 4 wherein the liquid crystal molecules are perpendicular to the substrate when no electric field is applied.

6. The liquid crystal display of claim 1 wherein the pattern of openings comprises, for each display element, at least a first substantially rectangular shape, said rectangular shape being disposed at an angle with respect to an edge of the display element.

7. The liquid crystal display of claim 6 wherein the pattern of openings comprises, for each display element, a second substantially rectangular shape disposed in a direction substantially perpendicular to the first rectangular shape, the first and second rectangular shapes intersecting one another.

8. The liquid crystal display of claim 6 wherein the pattern of openings comprises for each display element a second rectangular shape disposed at an angle with respect to the first rectangular shape and intersecting the first rectangular shape.

9. The liquid crystal display of claim 8 wherein the display element has a length greater than its width and the rectangular shapes intersect at an angle which is other than a right angle.

10. The liquid crystal display of claim 9 wherein said rectangular shapes are parallel to sides of said display element.

11. The liquid crystal display of claim 1 wherein the pattern of openings comprises, for each display element, a rectangular shape disposed at an angle with respect to a side at said display element.

12. The liquid crystal display of claim 1 wherein the display elements have a length greater than their widths and the pattern of openings for each display element comprises:

a first substantially rectangular opening extending parallel to the length of the display element and disposed centrally thereof with respect to the width of said display element, said opening extending along less than the entire length of the display element and two substantially rectangular extensions of said opening extending from each end thereof each toward a respective corner of said display element.

13. The liquid crystal display of claim 1 wherein the pattern includes two parallel rectangular cutouts on opposite edges of each display element and extending from diagonally opposite corners of said display element.

14. The liquid crystal display of claim 1 wherein said pattern of openings comprises, for each display element, a pattern repeating along the length thereof, said plurality of electrodes each having a rectangular opening therein disposed so as to be opposite a region of said common electrodes which defines a separation between successive repeating patterns.

15. The liquid crystal display of claim 1, further comprising at least one active device disposed on said first substrate for each display element, and electrical conductors for conducting signals to said at least one active device.

16. An active matrix, twisted nematic liquid crystal display comprising display elements arranged in an array of rows and columns, a first substrate, a second substrate having a common electrode thereon, a liquid crystal material disposed between the first substrate and the second substrate, and the common electrode having a pattern of openings therein so that each display element is caused to have more than one liquid crystal domain, the common electrode being continuous except at the pattern, the common electrode spanning an entire display area so as to serve as an electrode for all said display elements.

17. The liquid crystal display of claim 16 wherein the first substrate and the second substrate are rubbed in directions so that the pretilt of liquid crystal molecules at the first substrate is in a direction opposite to the pretilt of liquid crystal molecules at the second substrate.

18. The liquid crystal display of claim 16 wherein the pattern of openings comprises for each display element, at least a first substantially rectangular shape, said rectangular shape being disposed at an angle with respect to an edge of the display element.

19. The liquid crystal display of claim 18 wherein the pattern of openings comprises, for each display element, a second substantially rectangular shape disposed in a direction substantially perpendicular to the first rectangular shape, the first and second rectangular shapes intersecting one another.

20. The liquid crystal display of claim 18 wherein the pattern of openings comprises for each display element a second rectangular shape disposed at an angle with respect to the first rectangular shape and intersecting the first rectangular shape.

21. The liquid crystal display of claim 20 wherein the display element has a length greater than its width and the rectangular shapes intersect at an angle which is other than a right angle.

22. The liquid crystal display of claim 21 wherein said rectangular shapes are parallel to sides of said display element.

23. The liquid crystal display of claim 16 wherein the pattern of openings comprises, for each display element, a rectangular shape disposed at an angle with respect to a side of said display element.

24. The liquid crystal display of claim 16 wherein the display element has a length greater than its width and the pattern comprises:
a first substantially rectangular opening extending parallel to the length of the display element and disposed centrally thereof with respect to the width of said display element, said opening extending along less than the entire length of the display element, and two substantially rectangular extensions of said opening extending from each end thereof, each toward a respective corner of said display element.

25. The liquid crystal display of claim 16 wherein the pattern includes two parallel rectangular cutouts on opposite edges of each display element and extending from diagonally opposite corners of said display element.

26. The liquid crystal display of claim 16 wherein said pattern of openings comprises, for each display element, a pattern repeating along the length thereof, said plurality of electrodes, each having a rectangular opening therein disposed so as to be opposite a region of said common electrode which defines a separation between successive repeating patterns.

27. A multidomain twisted nematic liquid crystal display having a first substrate, a second substrate, at least one electrode on each substrate, and a liquid crystal material between said substrates, at least one of said electrodes being configured with openings therein so that a fringe field produced by said openings at one edge of a domain is parallel to a fringe field produced at an opposite edge of said domain, said first substrate and said second substrate each having a respective alignment layer, said alignment layers causing liquid crystal molecules to be pretilted in a first direction at said first substrate and in a second direction at said second substrate, said first direction being opposite said second direction.

28. The liquid crystal display of claim 27 wherein said first alignment layer and said second alignment layer are rubbed to cause said pretilt of said molecules.

29. The liquid crystal display of claim 27 wherein a twist angle of molecules of said liquid crystal material is between zero and 360 degrees.

* * * * *